United States Patent
Hsieh et al.

(10) Patent No.: US 9,104,269 B2
(45) Date of Patent: Aug. 11, 2015

(54) TOUCH CONTROL APPARATUS AND ASSOCIATED SELECTION METHOD

(71) Applicant: Wistron Corporation, New Taipei (TW)

(72) Inventors: Sheng-Hsien Hsieh, New Taipei (TW);
Po-Liang Huang, New Taipei (TW);
Shou-Te Wei, New Taipei (TW);
Ruey-Jiann Lin, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 4 days.

(21) Appl. No.: 14/106,901

(22) Filed: Dec. 16, 2013

(65) Prior Publication Data

US 2014/0267172 A1  Sep. 18, 2014

(30) Foreign Application Priority Data

Mar. 15, 2013  (TW) .............................. 102109329 A

(51) Int. Cl.
*G06F 3/042* (2006.01)
*G06F 3/0481* (2013.01)
*G06F 3/0488* (2013.01)

(52) U.S. Cl.
CPC ............ *G06F 3/0421* (2013.01); *G06F 3/0488* (2013.01); *G06F 3/04815* (2013.01)

(58) Field of Classification Search
None
See application file for complete search history.

(56) References Cited

U.S. PATENT DOCUMENTS

2010/0328243 A1*  12/2010  Wang et al. .................... 345/173
2013/0050559 A1*  2/2013  Chen et al. ..................... 348/335

FOREIGN PATENT DOCUMENTS

CN  101866246 A  10/2010
TW  M423406  2/2012

OTHER PUBLICATIONS

English Abstract translation of TWM423406 (Published Feb. 21, 2012).
English Abstract translation of CN101866246 (Published Oct. 20, 2010).
TW Office Action dated Dec. 27, 2014.
Partial English translation of TW Office Action dated Dec. 27, 2014.

* cited by examiner

*Primary Examiner* — Muhammad N Edun
(74) *Attorney, Agent, or Firm* — McClure, Qualey & Rodack, LLP

(57) ABSTRACT

A touch control apparatus includes a first light source, a first sensor, a second light source, a second sensor and a controller. An associated selection method includes following steps. The first and the second light sources are driven to respectively generate a first and a second plane lights. Both the first and the second plane light are reflected by at least two touch points. A left reflected light distribution is sensed and transformed into multiple left depth parameters by the first sensor, and a right reflected light distribution is sensed and transformed into multiple right depth parameters by the second sensor. Correspondingly, positions of the at least two touch points are selected from the candidate touch points according to the left and right depth parameters.

21 Claims, 9 Drawing Sheets

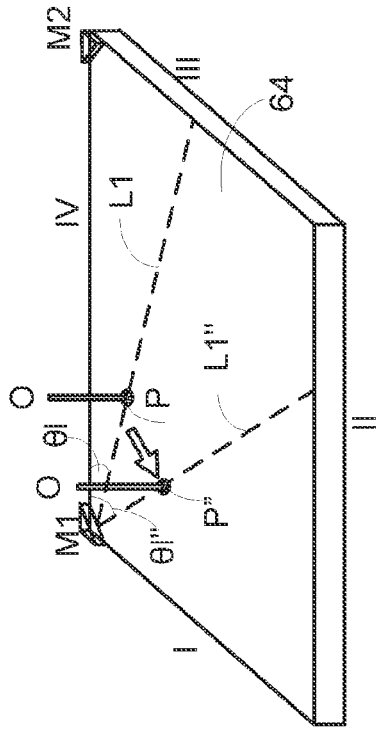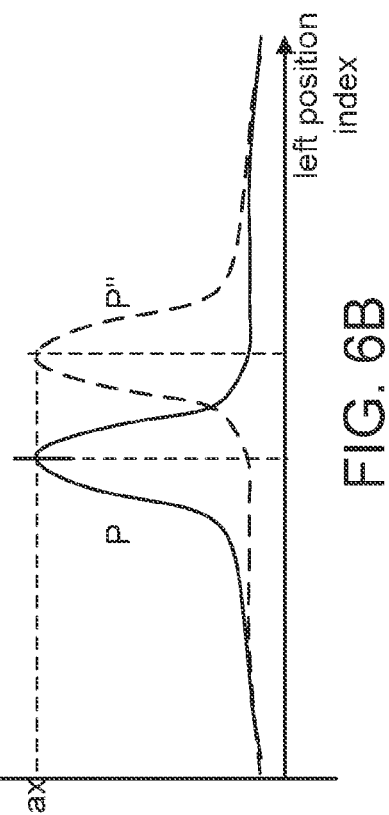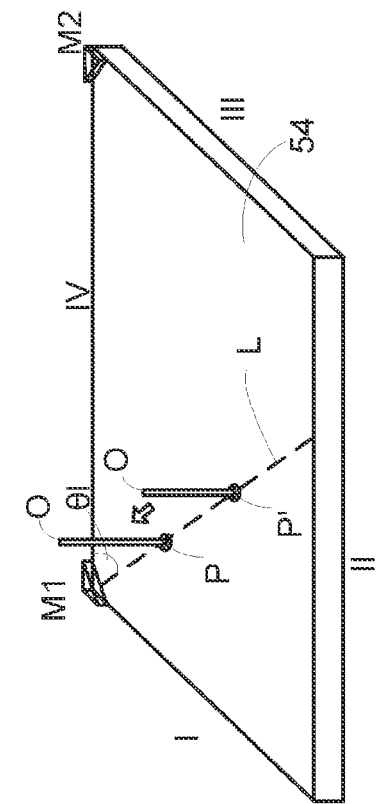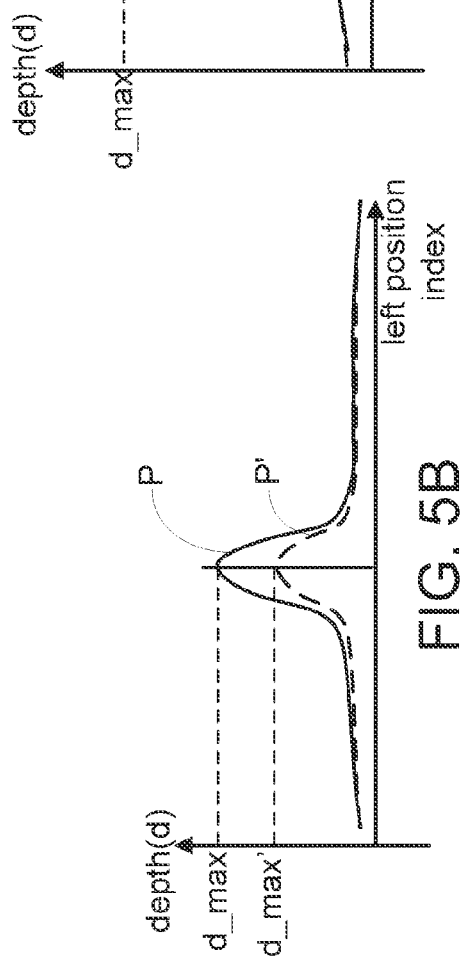
FIG. 5A
FIG. 6A
FIG. 5B
FIG. 6B

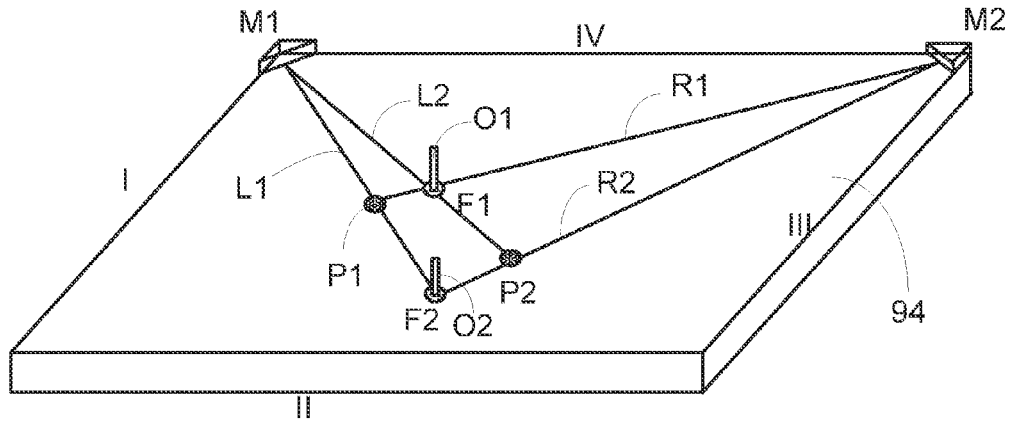
FIG. 9A
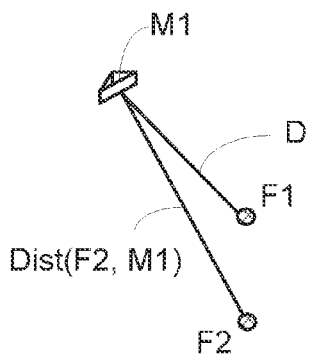
FIG. 9B
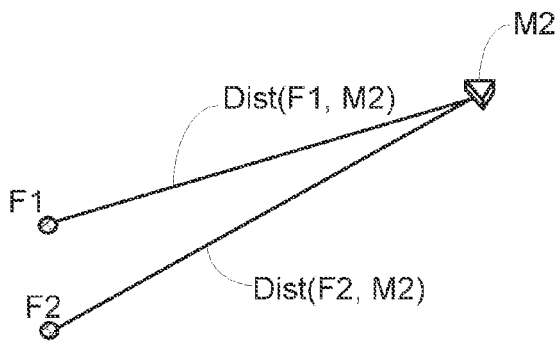
FIG. 9C
| | Sensor | First sensor | | Second sensor | |
|---|---|---|---|---|---|
| | Position index | Small to large | | Small to large | |
| Distribution type of touch points | FIG. 7A | Second largest P2 | Largest P1 | Second largest P1 | Largest P2 |
| | FIG. 9A | Largest F1 | Second largest F2 | Largest F1 | Second largest F2 |
FIG. 10

| Position index | First sensor Small to large | | | Second sensor Small to large | | |
|---|---|---|---|---|---|---|
| G1 ● | Closer P3g1 | Medium P2g1 | Farther P1g1 | Closer P3g1 | Medium P2g1 | Farther P1g1 |
| G2 ◈ | Medium P2g2 | Farther P1g2 | Closer P3g2 | Farther P3g2 | Closer P2g2 | Medium P1g2 |
| G3 ○ | Farther P1g3 | Closer P3g3 | Medium P2g3 | Medium P3g3 | Farther P2g3 | Closer P1g3 |

TOUCH CONTROL APPARATUS AND ASSOCIATED SELECTION METHOD

This application claims the benefit of Taiwan application Serial No. 102109329, filed on Mar. 15, 2013, the subject matter of which is incorporated herein by reference.

BACKGROUND OF THE INVENTION

1. Field of the Invention

The invention relates in general to a touch control apparatus and an associated selection method, and more particularly to an optical touch control apparatus and an associated selection method.

2. Description of the Related Art

Based on different operation principles, touch control technologies may be categorized into capacitive touch technology, resistive touch technology and optical touch technology.

Among the above touch control technologies, the optical touch technology calculates coordinate of a position of a touch point through light shielding. The optical touch technology is easily applied to large-size applications and has lower production costs.

FIG. 1A shows a schematic diagram of a conventional optical touch control apparatus determining a touch point of a single object. In short, in an optical touch control apparatus, after lights are emitted from light machines (M1 and M2), an image sensor detects whether a touch point exists and coordinates of the touch point are further determined.

After infrared light is emitted from the light sources, a reflected light distribution at a position of an object O will be changed. At this point, the image sensor, cooperating with a controller, may calculate the position of the touch point according to changes in the reflected light distribution.

For illustration purposes, in the present context, an included angle formed by a connection line between the object O and the first light machine M1, and a fourth side IV of a display panel 14, is referred to as a left included angle $\theta l$. Similarly, an included angle formed by a connection line between the object O and the second light machine M2, and the fourth side IV of the display panel 14, is referred to as a right included angle $\theta r$. In the description below, it is assumed that sensors are disposed in the light machines. Thus, M1 is used to represent the first light machine/first sensor, and M2 is used to represent the second light machine/second sensor.

In FIG. 1A, according to a triangle formed by the position of the object O and the two light machines (M1 and M2), the controller may obtain an upper-left angle (the left included angle $\theta l$) and an upper-right angle (the right included angle $\theta r$) of the triangle. Coordinates of the touch point can then be calculated by a triangle function. The calculation of the position may be completed by real-time calculations, or may be obtained with a look-up table (hereinafter, LUT).

However, the conventional optical touch technology is inadequate in providing accurate touch points for multi-touch applications. When the number of the objects is plural, a conventional optical touch control apparatus may encounter confusions when determining the touch points due to different combinations of the left included angle $\theta l$ and the right included angle $\theta r$.

When there are multiple objects, multiple left included angles $\theta l$ and multiple right included angles $\theta r$ are correspondingly generated. Numbers of the multiple left included angles and the multiple right included angles are defined in an increasing order. For example, a smallest left included angle is numbered as $\theta l1$, a smallest right included angle is numbered as $\theta r1$, and so forth.

When there are multiple objects, a connection line L between the objects and the first light machine M1 is represented according to the numbers of the left included angles. Similarly, a connection line R between the objects and the second light machine M2 is represented according to the numbers of the right included angles.

FIG. 1B shows a schematic diagram of a misjudgment on touch points by a conventional optical touch control apparatus when two objects exist on a display panel. In the diagram, it is assumed that a position of a first object O1 is P1, and a position of a second object O2 is P2.

Therefore, according to a triangle formed by the first object O1, the first light machine M1 and the second light machine M2, the second left included angle $\theta l2$ and the first right included angle $\theta r1$ can be obtained. Similarly, according to a triangle formed by the second object O2, the first light machine M1 and the second light machine M2, the first left included angle $\theta l1$ and the second right included angle $\theta r2$ can be obtained.

It can be concluded from the above, when two objects exist on the display panel 14, the sensors sense four included angles, i.e., the first left included angle $\theta l1$, the second left included angle $\theta l2$, the first right included angle $\theta r1$ and the second right included angle $\theta r2$.

When estimating touch points according to the first left included angle $\theta l1$ with the first right included angle $\theta r1$ and the second right included angle $\theta r2$, respectively, the controller obtains a candidate touch position F1 and a candidate touch position P2.

Further, when estimating touch points according to the second left included angle $\theta l2$ with the first right included angle $\theta r1$ and the second right included angle $\theta r2$, respectively, the controller obtains a candidate touch position P1 and a candidate touch position F2.

That is to say, the four candidate positions (P1, P2, F1 and F2) can be derived from combinations of the four included angles. However, the candidate touch position F1 and the candidate touch position F2 are not actual positions of the touch points.

The controller determines the above candidate touch positions according to positions of shadows replied from the sensors. When selecting two out of four, two of the shadows are false, and are referred to ghost points. These ghost points lead the controller to misjudge the actual positions of the touch points, as in the example above. Thus, the candidate touch position F1 and the candidate touch position F2 in FIG. 1B are ghost points.

As previously stated, when there are two touch points, the first sensor obtains two left included angles through sensing, and the second sensor also obtains two right included angles through sensing. Combinations of the two left included angles and the two right included angles form four candidate touch positions. By deducting the actual positions of the touch points from the four candidate touch positions, there are two ghost points.

As the number of touch points increases, the number of shadows (the candidate touch positions) obtained by the sensors also becomes larger, meaning that possibilities of misjudging ghost points as touch points also get higher.

For example, with three objects (in equivalence to three touch points on the display panel), the first sensor senses to obtain three left included angles, and the second sensor also senses to obtain three right included angles. Combinations of the three left included angles and the three right included angles form nine candidate touch positions. After deducting positions of the actual touch points, there are as many as six ghost points.

It can be deduced that, the number of candidate touch positions is substantially equal to a square of the number of objects. Therefore, as the number of objects increases, when designing an optical touch control apparatus, there is a need for a solution for quickly eliminating positions of ghost points from numerous candidate touch positions and to correctly select actual positions of touch points.

SUMMARY OF THE INVENTION

According to an aspect of the present invention, a touch control apparatus is provided. The touch control apparatus, capable of determining touch points corresponding to at least two objects, includes: a display panel; a first light source, located at a left side of the display panel, for generating a first plane light, which is reflected by the at least two objects to form a left reflected light distribution; a first sensor, disposed at the display panel, for sensing and transforming the left reflected light distribution to a plurality of left depth parameters; a second light source, located at a right side of the display panel, for generating a second plane light, which is reflected by the at least two objects to form a right reflected light distribution; a second sensor, disposed at the display panel, for sensing and transforming the right reflected light distribution to a plurality of right depth parameters; and a controller, electrically coupled to the first sensor and the second sensor, for selecting the touch points corresponding to the at least two objects according to the left depth parameters and the right depth parameters.

According to another aspect of the present invention, a selection method is provided. The selection method is for selecting, from a plurality of candidate touch positions of a touch control apparatus, touch points corresponding to at least two objects. The selection method includes: driving a first light source to generate a first plane light, and reflecting the first plane light by the at least two objects under to form a left reflected light distribution; sensing the left reflected light distribution by a first sensor, and representing the left reflected light distribution by a plurality of left depth parameters; driving a second light source to generate a second plane light, and reflecting the second plane light by the at least two objects to form a right reflected light distribution; sensing the right reflected light distribution by a second sensor, and representing the right reflected light distribution by a plurality of right depth parameters; and selecting the touch points corresponding to the at least two objects from the candidate touch positions according to the left depth parameters and the right depth parameters.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5A is a schematic diagram of determining a relative distance between a touch point and a first sensor in a touch control apparatus;

FIG. 5B is a schematic diagram of how the left position index and a left depth parameter are affected when positions of the object O in FIG. 5A are changed;

FIG. 6A is a schematic diagram of determining a relative distance between a touch point and the first sensor in a touch control apparatus;

FIG. 6B is schematic diagram of how a left position index and a left depth parameter are affected when positions of the object O in FIG. 6A are changed;

FIG. 9A is a schematic diagram of two objects located at candidate touch positions F1 and F2, respectively;

FIG. 9B is a schematic diagram of sensing two touch points on a display panel by a first sensor when the touch points are in a combination in FIG. 9A;

FIG. 9C is a schematic diagram of sensing two touch points on a display panel by a second sensor when the touch points are in a combination in FIG. 9A;

FIG. 10 a schematic diagram of information generated by a first sensor and a second sensor when objects are in two arrangements respectively depicted in FIGS. 7A and 9A;

DETAILED DESCRIPTION OF THE INVENTION

The present invention is directed to a touch control apparatus capable of selecting actual positions of touch points from a plurality of candidate touch positions and an associated selection method.

Figure 1A:
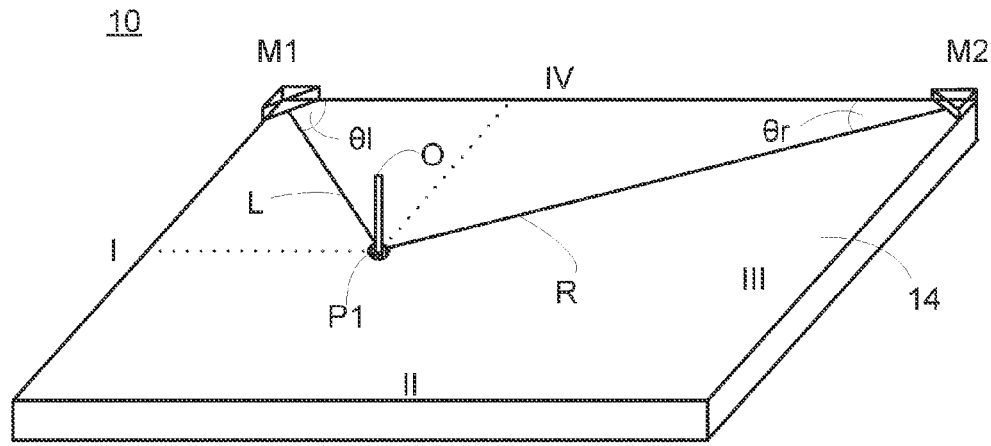
FIG. 1A (prior art) is a schematic diagram of a conventional optical touch control apparatus determining a touch point of a single object.
Figure 1B:
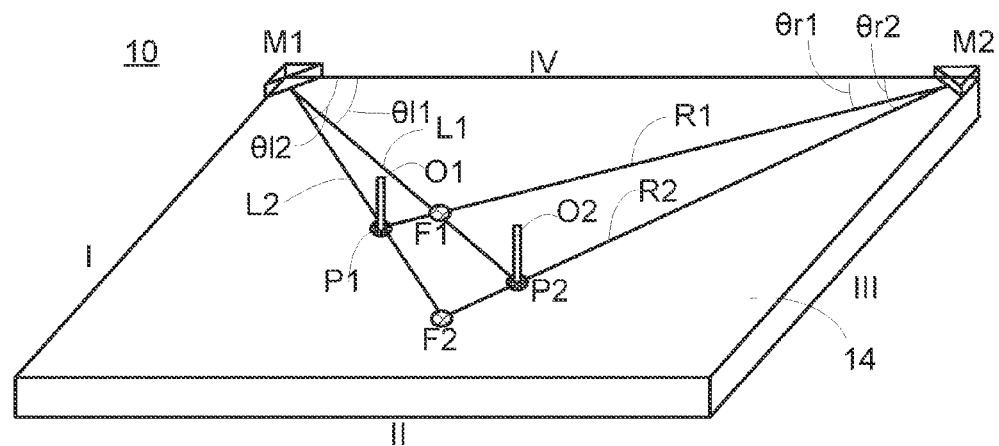
FIG. 1B (prior art) is a schematic diagram of a misjudgment on touch points by a conventional optical touch control apparatus when two objects exist on a display panel.
Figure 2:
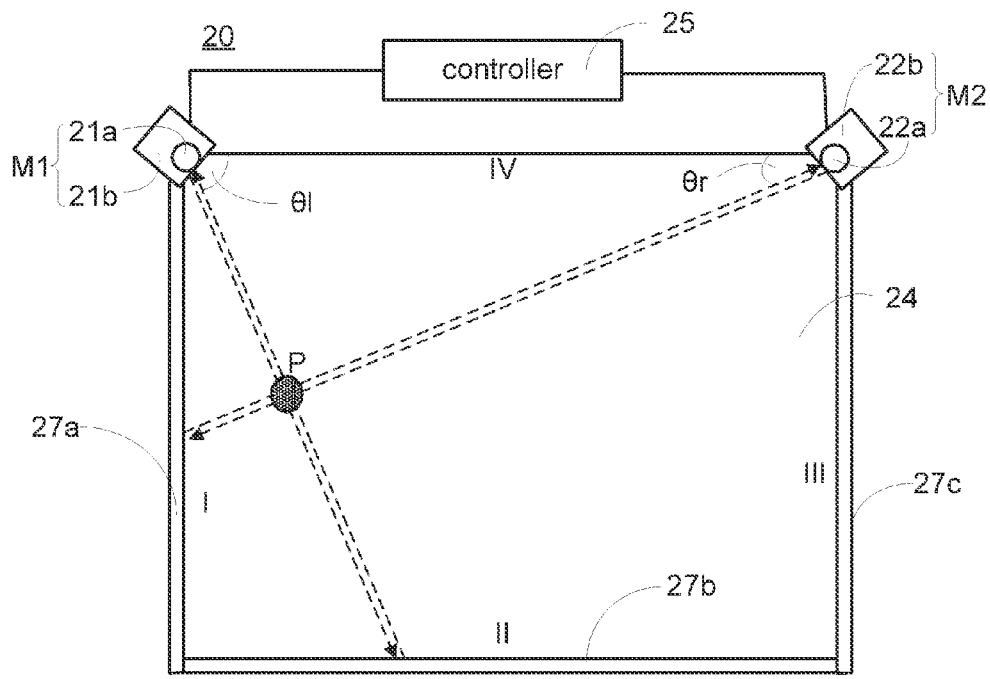
FIG. 2 is a schematic diagram of an optical ouch control apparatus.

FIG. 2 shows a schematic diagram of an optical touch control apparatus. A touch control apparatus 20 according an embodiment includes a display panel 24, a first light source 21a, a first sensor 21b, a second light source 22a, a second sensor 22b and a controller 25.

The display panel 24 is a rectangle having a first side I, a second side II, a third side III and a fourth side IV. In FIG. 2, the first side I and the third side III of the display panel 24 are parallel, and the second side II and the fourth side IV of the display panel 24 are parallel.

A first light machine M1 and a second light machine M2 are respectively disposed at an included angle formed by the first side I and the fourth side IV, and an included angle formed by the third side III and the fourth side IV.

Each of the light machines includes an image sensor and a light source. For example, the image sensors may be a depth lens. The type of light sources of the touch control apparatus is not limited. For example, the light sources may be infrared light sources, laser light sources or light-emitting diode (hereinafter, LED) light sources. When the light sources are laser light sources, collimation lenses and filters are additionally included. In the description below, the light sources are exemplified by laser light sources.

The first light machine M1 drives the first light source 21a to emit a first emitted light, which is condensed into a first dot light source through a first collimation lens. The first collimation lens is disposed in front of the first light source 21a. A first plane light is then formed from the first dot light source a through a first filter disposed in front of the first collimation lens. The first plane light is reflected by objects to form a left reflected light distribution. At this point, the first sensor disposed at the display panel 24 senses the left reflected light distribution.

Approaches for generating the plane light may vary for different types of techniques adopted by the light source. For example, a filter is additionally utilized due to a collimation lens is used together with a laser light source. When the light source is an LED or infrared that is a plane light source, a filter is no longer required for converting an emitted light into a plane light.

Further, the second light machine M2 drives the second light source 22a to emit a second emitted light, which is condensed into a second dot light source through a second collimation lens. The second collimation lens is disposed in front of the second light source 22a. A second plane light is then formed from the second dot source through a second filter disposed in front of the second collimation lens. The second plane light is reflected by the objects to form a right reflected light distribution. At this point, the second sensor disposed at the display panel 24 senses the right reflected light distribution.

Light absorbent edges or retroreflective edges 27a, 27b and 27c are disposed at a lower edge (the second side II), a left edge (the first side I) and a right edge (the third side III) of the display panel 24.

The method utilizing light absorbent edges is referred to as a reflective method, in which infrared light emitted from an infrared light source is absorbed. When employing the light absorbent edges, most reflected light is absorbed by the light absorbent edges.

Assuming that no objects exist on the display panel, the left reflected light distribution received by the first sensor 21b and the right reflected light distribution received by the second sensor 22b present a very low brightness level. On the contrary, when objects exist on the display panel, as the objects reflect the first and second plane lights, the left reflected light distribution received by the first sensor 21b and the right reflected light distribution received by the second sensor 22b present an increased brightness level at positions corresponding to the objects.

The method utilizing retroreflective edges is referred to as a shielding method, in which infrared light is reflected by the retroreflective edges. When employing the retroreflective edges, most reflected light is reflected by the retroreflective edges.

Assuming that no objects exist on the display panel, the left reflected light distribution received by the first sensor 21b and the right reflected light distribution received by the second sensor 22b present an extremely high brightness level. On the contrary, when objects exist on the display panel, since the objects reflect the first and second plane lights, and reflection coefficients of the objects and the retroreflective edges are different, the left reflected light distribution received by the first sensor 21b and the right reflected light distribution received by the second sensor 22b present a reduced brightness level at the positions corresponding to the objects.

In other words, characteristics in the left/right reflected light distribution differ according to the light absorbent edges or retroreflective edges utilized. For illustration purposes, an example of light absorbent edges is given in the description below. However, the display panel 24 having either light absorbent edges or retroreflective edges can be applied with the concept of the present invention.

In the following description, details for determining the left included angle and a relative distance between the first sensor M1 and a touch point are given. Details for determining the right included angle and relative distance between the second sensor M2 and a touch point can be similarly deduced, and shall be omitted herein.

Figure 3:
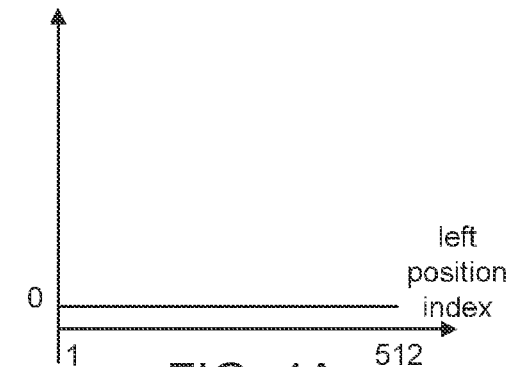
FIG. 3 is a schematic diagram of a relationship between a left position index and a left included angle.

FIG. 3 shows a schematic diagram of a relationship between a left position index and a left included angle. It is assumed that included angle ranges detectable by the first sensor M1 and the second sensor M2 are both 90 degrees. Included angle ranges of the sensors are not limited to the above example.

According to a concept of the present invention, the 90-degree left included angle detectable by the first sensor M1 may be represented by a plurality of left position indices. For example, a left position index "1" represents 0 degree, a left position index "512" represents 90 degrees, and corresponding relationships between the remaining degrees and left position indices are calculated by ratio through interpolation, or determined according to a predefined method. It should be noted that, the number and the range of the left position indices are not limited to particular values.

The first sensor M1 and the second sensor M2 of the present invention may include a depth of field lens capable of depth sensing. Thus, the first sensor M1 may represent surrounding objects within the sensing range by a plurality of left depth parameters. In an embodiment, each of the left position indices corresponds to each of the left depth parameters.

The first sensor M1 capable of depth sensing may further provide information, such as whether an object exists on the display panel or a relative distance between the object and the first sensor M1, to the controller.

Figures 4A, 4B:
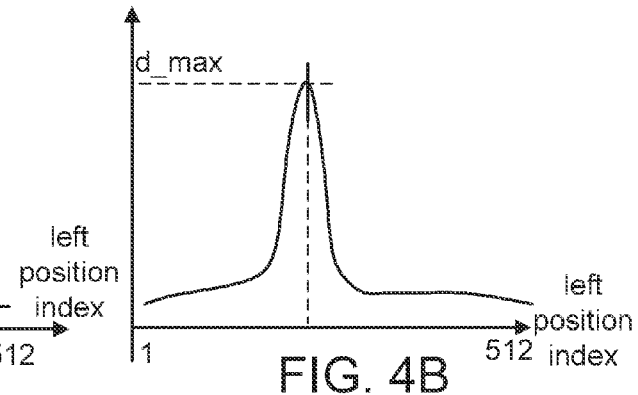
FIG. 4A shows a schematic diagram of corresponding relationship between left position indices and left depth parameters when no object exists on the display panel.
FIG. 4B shows a schematic diagram of corresponding relationship between left position indices and left depth parameters when an object exists on the display panel.

FIG. 4A shows a schematic diagram of corresponding relationship between left position indices and left depth parameters when no object exists on the display panel. When no object exists on a plane of the display panel, the left depth parameters sensed by the first sensor M1 are all quite small (e.g., 0). At this point, the corresponding relationship between the left position indices and the left depth parameters may display a horizontal line.

FIG. 4B shows a schematic diagram of corresponding relationship between left position indices and left depth parameters when an object exists on the display panel. When an object exists on the plane of the display panel, the first sensor generates a depth value corresponding to the position of the object. For example, the diagram illustrates a relative extremum value of a left depth parameter that the first sensor provides for the position (the left position index) of the touch point. As the number of objects increases, the relationship diagram for the left position indices corresponding to the left depth parameters contains more relative extremum values.

It should be noted that, the corresponding relationship between the relative distance between the object and the first sensor, and the left depth parameter, may vary according to characteristics of sensors. For example, assuming that the relative distance of the sensor and the left depth parameter are directly proportional, a value of the left depth parameter gets larger as the relative distance between the object and the first sensor increases. Alternatively, assuming that the relative distance of the sensor and the left depth parameter are inversely proportional, the value of the left depth parameter gets larger as the relative distance between the object and the first sensor decreases.

For illustration purposes, in the embodiment below, it is assumed that, the value of the left depth parameter gets larger as the relative distance between the object and the first sensor becomes shorter, and the value of the left depth parameter gets smaller as the relative distance between the object and the first sensor becomes farther.

FIG. 5A shows a schematic diagram of determining a relative distance between a touch point and a first sensor in a touch control apparatus. In FIG. 5A, situations of the object O respectively located at a touch point P and a touch point P' are illustrated. FIG. 5B shows a schematic diagram of how the left position index and a left depth parameter are affected when positions of the object O in FIG. 5A are changed.

When a relative distance between a touch point and the first sensor are changed while the left included angle stays the same, the peak value sensed by the first sensor M1 is changed while position of the left position index stays constant. For example, when the position of the touch point is moved from P to P', the relative distance between the touch point and the first sensor is increased. Consequently, a reflection brightness level of a reflected light generated by the touch point is lower. It is assumed that the left depth parameter gets smaller as the reflection brightness level lowers. As such, the peak value of the left depth parameter in FIG. 5B is also reduced (reduced from d_max to d_max').

FIG. 6A shows a schematic diagram of determining a relative distance between a touch point and the first sensor. In FIG. 6A, situations of the object O respectively located at a position P and a position P'" are illustrated. FIG. 6B shows a schematic diagram of how the left position index and the left depth parameter are affected when positions of the object O in FIG. 6A are changed.

When the relative distance between the touch point and the first sensor M1 stays constant while the left included angle is changed, the peak value sensed by the first sensor M1 remains the same. However, a value of the left position index ldx_l1 corresponding to the peak value also changes according to the change in the left included angle.

For example, when the position of the object O moves from position P to position P'" as shown in FIG. 6A, the left position index corresponding to the peak value in FIG. 6B is moved to the right as the left included angle is larger ($\theta l < \theta l'''$).

It is known from the above description, in addition to obtaining an included angle with the sensors, the present invention further determines an actual position of a touch point according to a relative extremum value of a depth parameter and a position index of the included angle.

In addition, the approach of the present invention can be applied to multi-touch. In the description below, two touch points and three touch points are taken as examples for illustrating how the present invention, with an existing triangle positioning approach, selects actual positions of touch points from a plurality of candidate touch positions.

FIGS. 7A, 7B, 7C, 8A, 8B, 9A, 9B, 9C and 10 illustrate how a touch control apparatus, eliminates ghost points and selects actual positions (i.e., the touch points) of objects from a plurality of candidate touch positions.

Figure 7A:
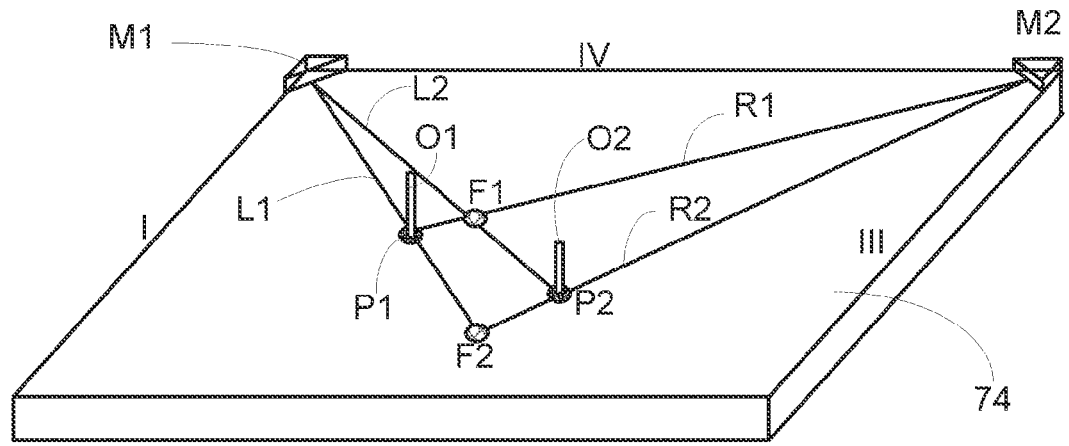
FIG. 7A is a schematic diagram of four candidate touch positions sensed by a touch control apparatus.

Assume a first touch point O1 and a second touch point O2 exist on the display panel. The first touch point O1 corresponds to a first left position index ldx_l1 and a first right position index ldx_r1. The second touch point O2 corresponds to a second left position index ldx_l2 and a second right position index ldx_r2. FIG. 7A shows a schematic diagram of four candidate touch positions sensed by the touch control apparatus. In FIG. 7A, it is assumed that actual positions of the objects (O1 and O2) are at P1 and P2, whereas F1 and F2 are ghost points.

Figure 7B:
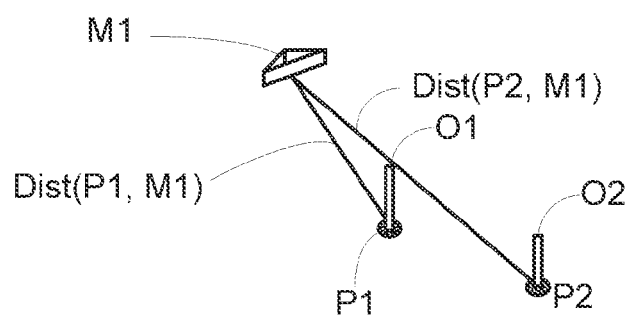
FIG. 7B is a schematic diagram of a first touch point combination when two objects exist on the display panel in FIG. 7A.

FIG. 7B shows a schematic diagram of a first touch point combination when two objects exist on the display panel in FIG. 7A. In this case, a distance Dist(P1, M1) between a first touch point P1 and the first sensor M1 is shorter than a distance Dist(P2, M1) between a second touch point P2 and the first sensor M1. That is, Dist(P1, M1)<Dist(P2, M1).

Figure 7C:
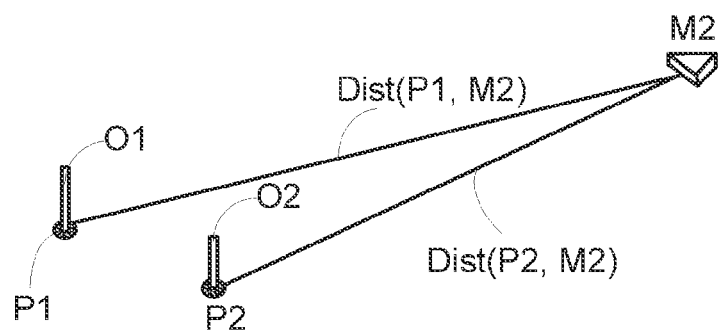
FIG. 7C is a schematic diagram of a second touch point combination when two objects exist on the display panel in FIG. 7A.

FIG. 7C shows a schematic diagram of a second touch point combination when two objects exist on the display panel in FIG. 7A. In this case, a distance Dist(P1, M2) between the first touch point P1 and the second sensor M2 is greater than a distance Dist(P2, M2) between the second touch point P2 and the second sensor M2. That is, Dist(P1, M2)>Dist(P2, M2).

For identification purposes, it assumed that the first touch point P1 where the first object O1 locates, corresponds to the first left position index lxd_l1 and the first right position index ldx_r1. And, the second touch point P2, where the second object O2 locates, corresponds to the second left position index ldx_l2 and the second right position index ldx_r2.

FIG. 5A shows a schematic diagram of relative positions of the touch point arrangement in FIG. 7B corresponding to the first sensor. For the first sensor M1, left depth parameters (d_max1 and d_max2) corresponding to the first left position index ld_l1 and the second left position index ld_l2 are extremum values among the left depth parameters.

Since the left included angle corresponding to the second touch point P2 is smaller than the left included angle corresponding to the first touch point P1, it is in equivalence that the left position index corresponding to the second touch point P2 is in a smaller value. Thus, it is confirmed that a left peak value in FIG. 8A corresponds to the second touch point P2.

Further, as the relative distance between the first touch point P1 and the first sensor M1 is smaller than the relative distance between the second touch point P2 and the first sensor M1, it means that the value of the left depth parameter corresponding to the first left position index ldx_l1 is larger. Therefore, a right peak value is greater than the left peak value.

Figure 8A:
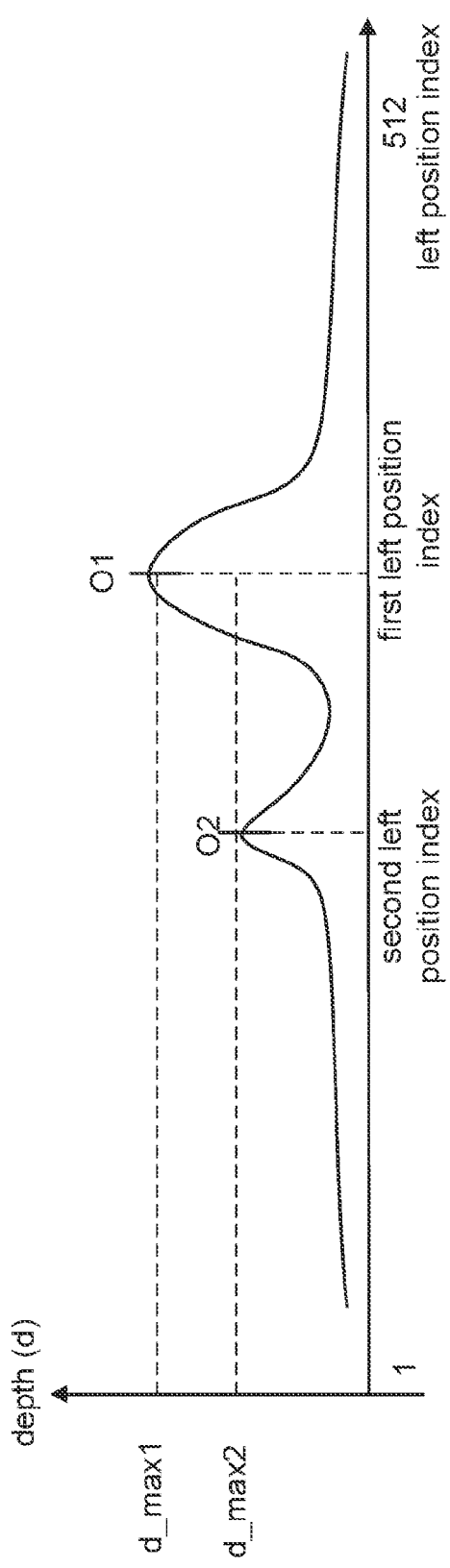
FIG. 8A is a schematic diagram of relative positions of the touch point arrangement in FIG. 7B corresponding to the first sensor.
Figure 8B:
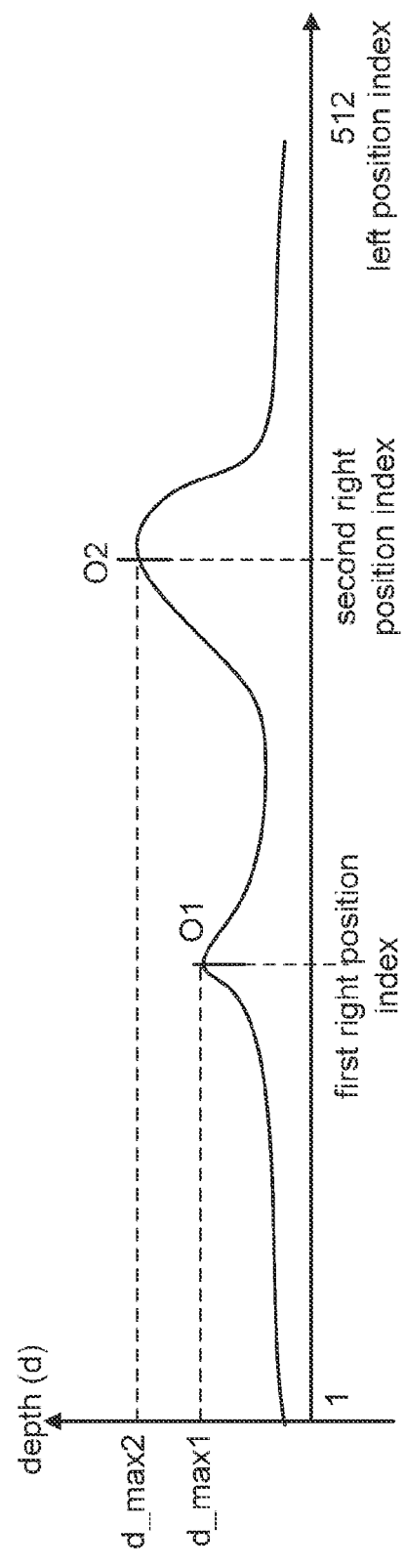
FIG. 8B is a schematic diagram of relative positions of the touch point arrangement in FIG. 7C corresponding to the second sensor.

FIG. 8B shows a schematic diagram of relative positions of the touch point arrangement in FIG. 7C corresponding to the second sensor. For the second sensor M2, the right depth parameters (d_max1 and d_max2) corresponding to the first right position index ldx_r1 and the second right position index ldx_r2 are extremum values among the right depth parameters.

The right included angle corresponding to the second touch point P2 is greater than the right included angle corresponding to the first touch point P1. As such, the first right position index ldx_r1 has a smaller value and the second right position index ldx_r2 has a greater value. Therefore, it is confirmed that a left peak value corresponds to the first touch point P1.

Further, the relative distance Dist(P1, M2) between the first touch point P1 and the second sensor M2 is greater than the relative distance Dist(P2, M2) between the second touch point P2 and the second sensor M2. That is, Dist(P1, M2)>Dist(P2, M2), meaning that the right depth parameter corresponding to the first right position index ldx_r1 is smaller. Therefore, in FIG. 8B, the left peak value is lower than the right peak value.

FIG. 9A shows a schematic diagram of two objects located at candidate touch positions F1 and F2, respectively. In FIG. 9A, it is assumed that the touch points where the objects are located are F1 and F2, whereas F1 and P2 are ghost points.

FIG. 9B shows a schematic diagram of sensing two touch points on a display panel by a first sensor when the touch points are in a combination in FIG. 9A. A distance Dist(F1, M1) between the first touch point P1 and the first sensor M1 is smaller than a distance Dist(F2, M1) between the second touch point P2 and the first sensor M1. That is, Dist(F1, M1)<Dist(F2, M1).

FIG. 9O shows a schematic diagram of sensing two touch points on a display panel by a second sensor when the touch points are in a combination in FIG. 9A. A distance Dist(F1, M2) between the first touch point P1 and the second sensor M2 is smaller than a distance Dist(F2, M2) between the second touch point P2 and the second sensor M2. That is, Dist(F1, M2)<Dist(F2, M2).

Similarly, when the objects are located at the candidate touch position F1 and the candidate touch position F2, sensing results of the first sensor M1 and the second sensor M2 may also be represented as left included angles, right included angles and distances relative to the touch points.

With the four candidate positions obtained by the controller according to a triangle function, it is in equivalence that the sensing result of the first sensor M1 indicates that, the left depth parameters corresponding to two left position indices (ldx_l1 and ldx_l2) have relative extremum values (peak values). Further, the sensing result of the second sensor M2 indicates that, the right depth parameters corresponding to two right position indices (ldx_r1 and ldx_r2) have relative extremum values (peak values). At this point, in the present invention, the relative extremum values (peak values) of the depth parameters are further compared to determine the positions of the touch points.

FIG. 10 shows a schematic diagram of information generated by a first sensor and a second sensor when objects are in two arrangements respectively depicted in FIGS. 7A and 9A.

Between the two extremum values (peak values) of the left depth parameters sensed by the first sensor M1, it is assumed that the relative extremum value represented by the left depth parameter corresponding to the relatively smaller left position index (min(ldx_l1, ldx_l2)) is the second largest, and the relative extremum value represented by the left depth parameter corresponding to the relatively larger left position index (max(ldx_l1, ldx_l2)) is the largest. Further, between the two extremum values (peak values) of the right depth parameters sensed by the second sensor M2, it is assumed that the extremum value represented by the right depth parameter corresponding to the relatively smaller right position index (min (ldx_r1 ldx_r2)) is the second largest, and the extremum value represented by the right depth parameter corresponding to the relative larger right position index (max(ldx_r1, ldx_r2)) is the largest. Accordingly, the controller determines that the positions of the two objects are located at the candidate touch positions P1 and P2, as shown in FIG. 7A.

On the other hand, between the two extremum values (peak values) of the left depth parameters sensed by the first sensor M1, assume that the relative extremum value represented by the left depth parameter corresponding to the relatively smaller left position index (min(ldx_l1, ldx_l12)) If) is the largest, and the one corresponding to the relatively larger left position index (max(ldx_l1, ldx_l2)) is the second largest. Further, between the two extremum values (peak values) of the right depth parameters sensed by the second sensor M2, assume that the extremum value represented by the right depth parameter corresponding to the relatively smaller right position index (min(ldx_r1, ldx_r2)) is the largest, and the one corresponding to the relative larger right position index (max(ldx_r1, ldx_r2)) is the second largest. At this point, the controller determines that the positions of the two objects are located at the candidate touch positions F1 and F2, as shown in FIG. 9A.

Therefore, when four candidate touch positions are obtained by the touch control apparatus according to the two left included angles and the two right included angles, it can be further determined that, according to the depth information provided by the first sensor M1 and the second sensor M2, the positions of the touch points are P1 and P2 as shown in FIG. 7A, or F1 and F2 as shown in FIG. 9A.

Figure 11:
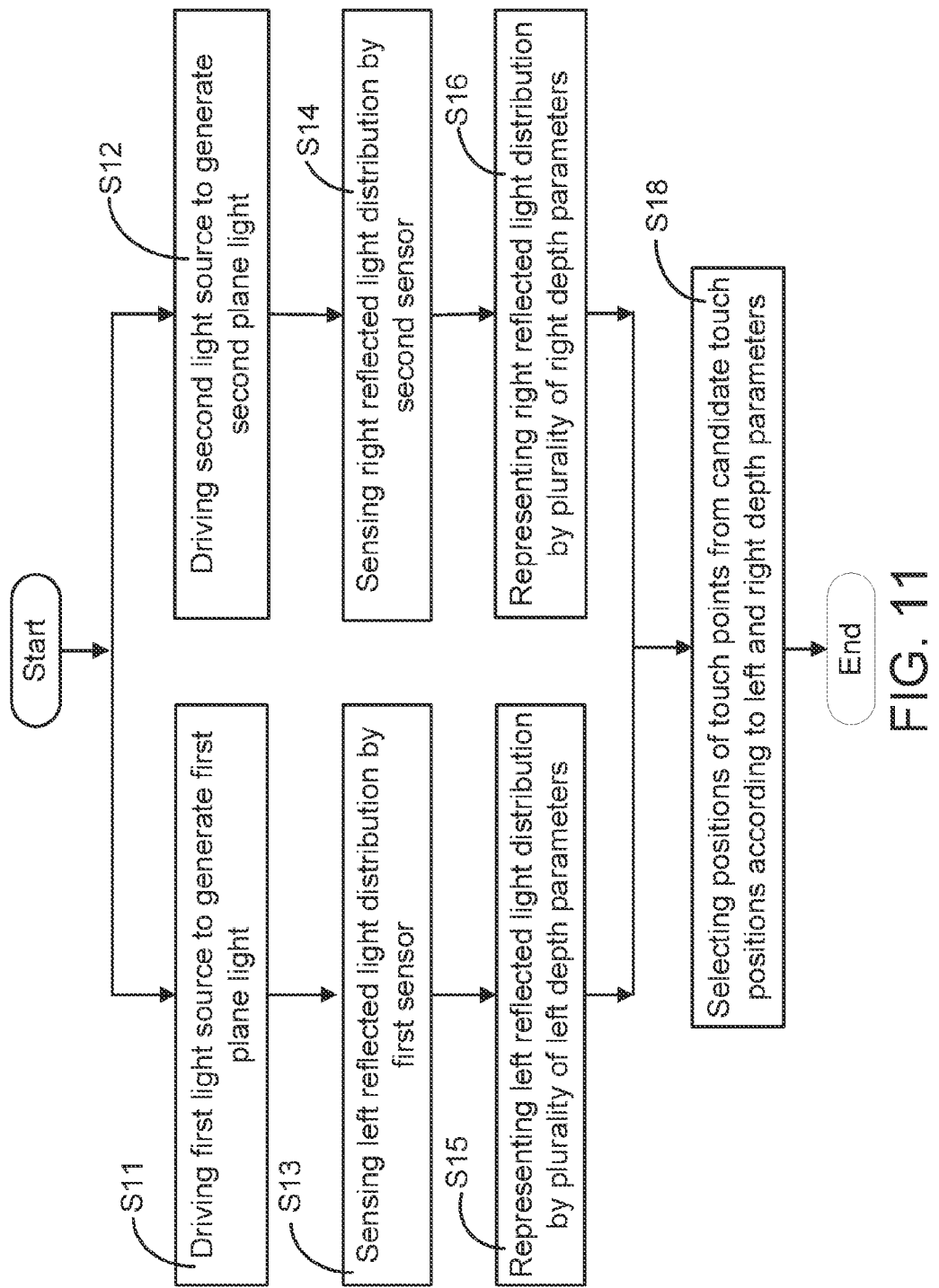
FIG. 11 is a flowchart of a selection method, applied to a touch panel, for selecting positions of least two touch points from a plurality of candidate touch positions.

FIG. 11 shows a flowchart of a selection method, applied to a touch panel, for selecting positions of least two touch points from candidate touch positions. The process on the left branch and the process on the right branch can be simultaneously performed or performed in sequence. Further, the sequence of the two branched processes is not limited when the two branched processes are performed in sequence.

The process of the left branch is described below. In step S11, a first light source is driven to generate a first plane light. The first plane light is reflected by touch points to form a left reflected light distribution. In step S13, the left reflected light distribution is sensed by a first sensor. In step S15, the left reflected light distribution is represented by a plurality of left depth parameters.

The process of the right branch is described below. In step S12, a second light source is driven to generate a second plane light. The second plane light is reflected by the touch points to form a right reflected light distribution. In step S14, the right reflected light distribution is sensed by a second sensor. In step S16, the right reflected light distribution is represented by a plurality of right depth parameters.

After completing the two branched processes, in step S18, the controller selects positions of the touch points from candidate touch positions by referring the left depth parameters and the right depth parameters.

Figure 12A:
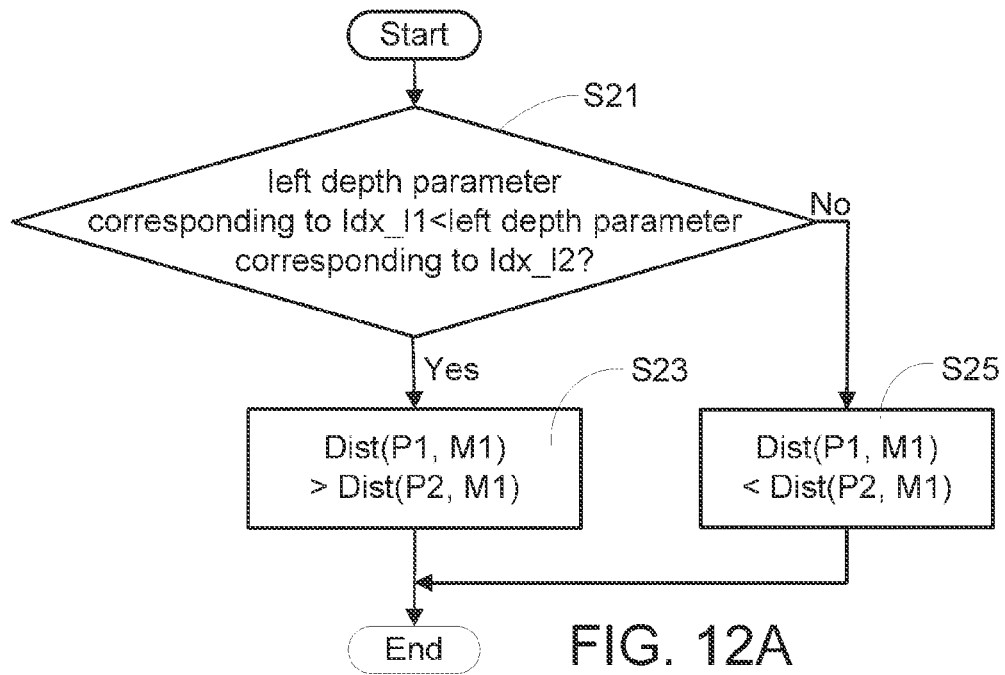
FIG. 12A is a flowchart for determining which touch point is closer to the first sensor in the left branched process in FIG. 11.

FIG. 12A shows a flowchart for determining which of the first and the second touch points is closer to the first sensor in the left branched process in FIG. 11. In step S21, a left depth parameter corresponding to a first left position index ldx_l1 and a left depth parameter corresponding to a second left position index ldx_l2 are compared. That is, sensing results of the first sensor M1 for a first touch point P1 and a second touch point P2 are compared to each other.

In step S23, when the left depth parameter corresponding to the first left position index ldx_l1 is smaller than that corresponding to the second left position index ldx_l2, it means that a relative distance Dist(P1, M1) between the first touch point P1 and the first sensor M1 is greater than a relative distance Dist(P2, M1) between the second touch point P2 and the first sensor M1.

In step S25, when the left depth parameter corresponding to the first left position index ldx_l1 is greater than that corresponding to the second left position index ldx_l2, it means that the relative distance Dist(P1, M1) between the first touch point P1 and the first sensor M1 is smaller than the relative distance Dist(P2, M1) between the second touch point P2 and the first sensor M1.

Figure 12B:
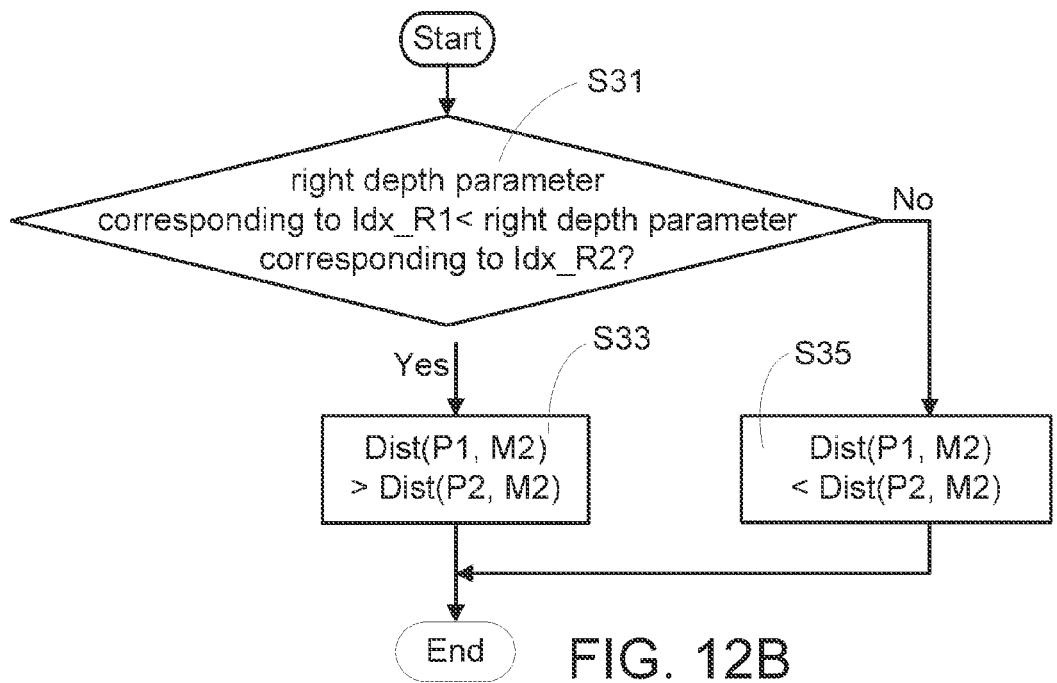
FIG. 12B is a flowchart for determining which touch point is closer to the second sensor in the right branched process in FIG. 11.

FIG. 12B shows a flowchart for determining which of the first and the second touch points is closer to the second sensor in the right branched process in FIG. 11. In step S31, the right depth parameter corresponding to the first right position index ldx_r1 and that corresponding to the second right position index ldx_r2 are compared. That is, sensing results of the second sensor M2 for the first and the second touch points (P1 and P2) are compared to each other.

In step S33, when the right depth parameter corresponding to the first right position index ldx_r1 is smaller than that corresponding to the second right position index ldx_r2, it means that the relative distance Dist(P1, M2) between the first touch point P1 and the second sensor M2 is greater than the relative distance Dist(P2, M2) between the second touch point P2 and the second sensor M2.

In step S35, when the right depth parameter corresponding to the first right position index ldx_r1 is greater than that corresponding to the second right position index ldx_r2, it means that the relative distance Dist(P1, M2) between the first touch point P1 and the second sensor M2 is smaller than the relative distance Dist(P2, M2) between the second touch point P2 and the second sensor M2.

Figures 13, 14:
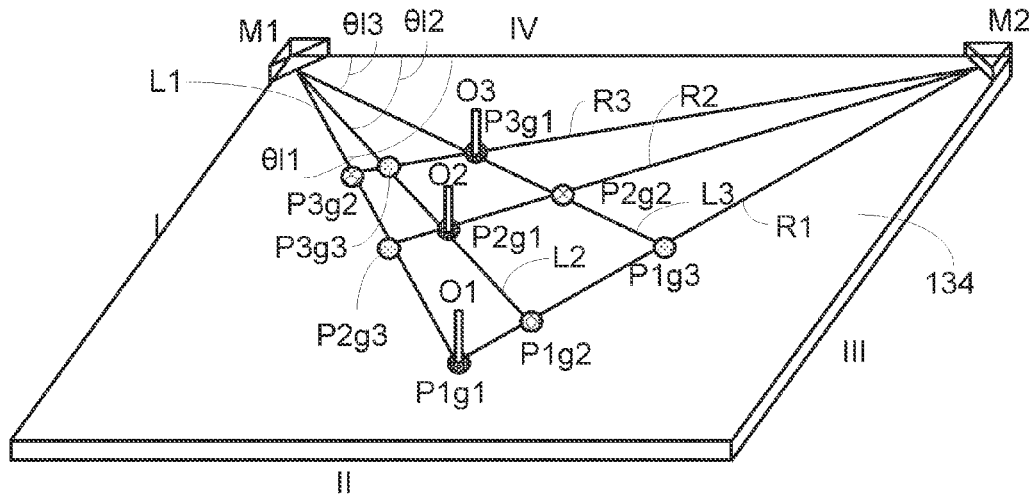
FIG. 13 is a schematic diagram for determining touch points of three objects by a touch control apparatus and a selection method.
FIG. 14 is a schematic diagram of information generated by the first sensor and the second sensor from three arrangements formed by three touch points.

With reference to FIGS. 13 and 14, when three objects exist on the display panel, details of how a touch control apparatus according to an embodiment of the present invention eliminates ghost points and selects actual positions of the three objects (i.e., touch points) from candidate touch positions are described below.

FIG. 13 shows a schematic diagram for determining touch points of three objects by a touch control apparatus and a selection method. In FIG. 13, it is assumed that three objects (O1, O2 and O3) are located at three positions P1g1, P2g1 and P3g1 on the display panel.

A left included angle θl1 is formed by the connection line L1 between the first object O1 and the first light machine M1, together with the fourth side IV of the display panel. A left included angle θl2 is formed by the connection line L2 between the first object O2 and the first light machine M1, together with the fourth side IV of the display panel. A left included angle θl3 is formed by the connection line L3 between the third object O3 and the first light machine M1, together with the fourth side IV of the display panel.

Therefore, nine candidate touch positions may be generated from the three left included angles and three right included angles. A first possible arrangement of the three touch points is that touch points are respectively located at the candidate touch positions P1g1, P2g1, and P3g1. A second possible arrangement of the three touch points is that the touch points are respectively located at candidate touch positions P1g2, P2g2 and P3g2. A third possible arrangement of the three touch points is that the touch points are respectively located at candidate touch positions P1g3, P2g3 and P3g3.

Similarly, by comparing the relative extremum values of the left depth parameters sensed by the first sensor M11, and by comparing the relative extremum values of the right depth parameters sensed by the second sensor M2, actual positions of the touch points of the objects can be determined.

FIG. 14 shows a schematic diagram of information generated by the first and the second sensors from the three arrangements formed by the three touch points. In the description below, peak values are illustrated toward a direction of increasing position indices (corresponding to left/right included angles in an increasing order).

When the objects are placed as the first arrangement, i.e., the three touch points are located at P1g1, P2g1 and P3g1, respectively, the three extremum values of the left depth parameters corresponding to P1g1, P2g1 and P3g1 sensed by the first sensor M1 are in a sequence of small, medium and large; and the three extremum values of the right depth parameters corresponding to P1g1, P2g1 and P3g1 sensed by the second sensor M2 are in a sequence of small, medium and large.

The extremum values of the depth parameters correspond to the relative distances between the three touch points and the sensors M1 and M2. Thus, according to the above combinations of depth parameters, relative distances between the touch points and the sensors can be determined. More specifically, toward the direction as the left included angle increases, the relative distances between the positions of the touch points and the first sensor M1 are a closer distance, a medium distance, and a farther distance. Further, toward the direction as the right included angle increases, the relative distances between the positions of the touch points and the second sensor M2 are a closer distance, a medium distance and a farther distance.

When the objects are placed as the second arrangement, i.e., the three touch points are located at P1g2, P2g2 and P3g2, respectively, the three extremum values of the left depth parameters corresponding to P1g2, P2g2 and P3g2 sensed by the first sensor M1 are in a sequence of small, medium and large; and the three extremum values of the right depth parameters corresponding to P1g2, P2g2 and P3g2 sensed by the second sensor M2 are in a sequence of medium, large and small.

The extremum values of the depth parameters correspond to the relative distances between the three touch points and the sensors M1 and M2. Thus, according to the above combinations of depth parameters, relative distances between the touch points and the sensors can be determined. More specifically, toward the direction as the left included angle increases, the relative distances between the positions of the touch points and the first sensor M1 are a medium distance, a farther distance, and a closer distance. Further, toward the direction as the right included angle increases, the relative distances between the positions of the touch points and the second sensor M2 are a farther distance, a closer distance and a medium distance.

When the third arrangement is displayed, i.e., the three touch points are located at P1g3, P2g3 and P3g3, respectively, the three extremum value of the left depth parameters corresponding to P1g3, P2g3 and P3g3 sensed by the first sensor M1 are in a sequence of small, medium and large; the three extremum values of the right depth parameters corresponding to P1g3, P2g3 and P3g3 sensed by the second sensor M2 are in a sequence of large, small and medium.

The extremum values of the depth parameters correspond to the relative distances between the three touch points and the sensors M1 and M2. Thus, according to the above combinations of depth parameters, relative distances between the touch points and the sensors can be determined. More specifically, toward the direction as the left included angle increases, the relative distances between the positions of the touch points and the first sensor M1 are a farther distance, a closer distance, and a medium distance. Further, toward the direction as the right included angle increases, the relative distances between the positions of the touch points and the second sensor M2 are a medium distance, a farther distance and a closer distance.

When the touch points display the three arrangements, the position indices/depth parameters sensed by the sensors contain particularity. Therefore, the touch control apparatus and selection method of the present invention may determine touch points where objects are located according to a plurality of candidate touch positions.

It is demonstrated by the embodiments of the present invention that, after obtaining depth information through a depth lens, ghost points can be quickly eliminated to select actual positions of touch points. In the foregoing embodiments, the selection method is explained by taking two or three selection touch points as examples. It should be noted that such method can be applied for filtering out ghost points in multi-touch operations involving a greater number of touch points.

It can be easily appreciated by a person having ordinary skill in the art that, various exemplary logic blocks, modules, circuits and steps in the above description may be implemented by electronic hardware and/or computer software. Connections between the implementations, described as in communication with, connecting, coupling, electrically coupling or other alternative terms, are for illustrating different means for implementing the logic blocks, modules, circuits and steps. For example, for wired electronic signals, wireless electromagnetic signals and optic signals, through signal exchange performed in direct or indirect connection means, signals, data and control information can be exchange and transferred. If the application describes or explains some terms, definition of the terms are based on the description or explanation of connection relationships, not limiting the present invention by the different connection means.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch control apparatus, for determining touch points corresponding to at least two objects from a plurality of candidate touch positions, the apparatus comprising:
    a display panel;
    a first light source, located at a left side of the display panel, for generating a first plane light, which is reflected by the at least two objects to form a left reflected light distribution;
    a first sensor, disposed at the display panel, for sensing and transforming the left reflected light distribution into a plurality of left depth parameters, wherein the plurality of left depth parameters are respectively corresponding to relative position between the at least two objects and the first sensor;
    a second light source, located at a right side of the display panel, for generating a second plane light, which is reflected by the at least two objects to form a right reflected light distribution;
    a second sensor, disposed at the display panel, for sensing and transforming the right reflected light distribution into a plurality of right depth parameters, wherein the plurality of right depth parameters are respectively corresponding to relative position between the at least two objects and the second sensor; and
    a controller, electrically coupled to the first sensor and the second sensor, for selecting touch points corresponding to the at least two objects from the plurality of candidate touch positions according to the plurality of left depth parameters and the plurality of right depth parameters.

2. The touch control apparatus according to claim 1, wherein a sensing range of the first sensor is represented by a plurality of left position indices corresponding to the plurality of left depth parameters, respectively; and a sensing range of the second sensor is represented by a plurality of right position indices corresponding to the plurality of right depth parameters, respectively.

3. The touch control apparatus according to claim 2, wherein the touch points of the at least two objects comprise a first touch point and a second touch point; the first touch point corresponds to a first left position index and a first right position index; and the second touch point corresponds to a second left position index and a second right position index.

4. The touch control apparatus according to claim 3, wherein the left depth parameter corresponding to the first left position index and the left depth parameter corresponding to the second left position index are relative extremum values among the left depth parameters; and the right depth parameter corresponding to the first right position index and the right depth parameter corresponding to the second right position index are relative extremum values among the right depth parameters.

5. The touch control apparatus according to claim 3, wherein when a relative distance between the first touch point and the first sensor is greater than a relative distance between the second touch point and the first sensor, the left depth parameter corresponding to the first left position index is smaller than the left depth parameter corresponding to the second left position index; and, when the relative distance between the first touch point and the first sensor is smaller than the relative distance between the second touch point and the first sensor, the left depth parameter corresponding to the first left position index is greater than the left depth parameter corresponding to the second left position index.

6. The touch control apparatus according to claim 3, wherein when a relative distance between the first touch point and the second sensor is greater than a relative distance between the second touch point and the second sensor, the right depth parameter corresponding to the first right position index is smaller than the right depth parameter corresponding to the second right position index; and, when the relative distance between the first touch point and the second sensor is smaller than the relative distance between the second touch point and the second sensor, the right depth parameter corresponding to the first right position index is greater than the right depth parameter corresponding to the second right position index.

7. The touch control apparatus according to claim 1, wherein a number of the candidate touch points is equal to a square of a number of the at least two objects.

8. The touch control apparatus according to claim 1, wherein the first sensor and the second sensor are depth lenses.

9. The touch control apparatus according to claim 1, wherein the first light source and the second light source are laser light sources or light-emitting diode light sources.

10. The touch control apparatus according to claim 1, wherein the first light source emits a first emitted light, and the second light source emits a second emitted light, the touch control apparatus further comprising:

a first collimation lens, disposed in front of the first light source, for condensing the first emitted light to form a first dot light source;

a first filter, disposed in front of the first collimation lens, for forming the first plane light from the first dot light source;

a second collimation lens, disposed in front of the second light source, for condensing the second emitted light to form a second dot light source; and a second filter, disposed in front of the second collimation lens, for forming the second plane light from the second dot light source.

11. The touch control apparatus according to claim 1, wherein the display panel is a rectangle having a first side, a second side, a third side and a fourth side; wherein the first side and the third side are parallel, and the second side and the fourth side are parallel.

12. The touch control apparatus according to claim 11, wherein the first light source is disposed at an included angle formed by the first side and the four side, and the second light source is disposed at an included angle formed by the third side and the fourth side.

13. The touch control apparatus according to claim 11, wherein the first side, the second side and the third side are disposed with a light absorbent edge or a retroreflective edge, respectively.

14. A selection method, for selecting touch points corresponding to at least two objects from a plurality of candidate touch positions of a touch control apparatus, the selection method comprising steps of:

driving a first light source to generate a first plane light, and the at least two objects reflecting the first plane light to form a left reflected light distribution;

sensing the left reflected light distribution by a first sensor, and representing the left reflected light distribution by a plurality of left depth parameters, wherein the plurality of left depth parameters are respectively corresponding to relative position between the at least two objects and the first sensor;

driving a second light source to generate a second plane light, and the at least two objects reflecting the second plane light to form a right reflected light distribution;

sensing the right reflected light distribution by a second sensor, and representing the right reflected light distribution by a plurality of right depth parameters, wherein the plurality of right depth parameters are respectively corresponding to relative position between the at least two objects and the second sensor; and selecting touch points corresponding to the at least two objects from the plurality of candidate touch positions according to the plurality of left depth parameters and the plurality of right depth parameters.

15. The method according to claim 14, wherein sensing range of the first sensor is represented by a plurality of left position indices corresponding to the left depth parameters, respectively; and a sensing range of the second sensor is represented by a plurality of right position indices corresponding to the right depth parameters, respectively.

16. The method according to claim 15, wherein touch points of the at least two objects comprise a first touch point and a second touch point; the first touch point corresponds to a first left position index and a first right position index; and the second touch point corresponds to a second left position index and a second right position index.

17. The method according to claim 16, wherein the left depth parameter corresponding to the first left position index and the left depth parameter corresponding to the second left position index are relative extremum values among the left depth parameters; and the right depth parameter corresponding to the first right position index and the right depth parameter corresponding to the second right position index are relative extremum values among the right depth parameters.

18. The method according to claim 16, wherein when a relative distance between the first touch point and the first sensor is greater than a relative distance between the second touch point and the first sensor, the left depth parameter corresponding to the first left position index is smaller than the left depth parameter corresponding to the second left position index; and, when the relative distance between the first touch point and the first sensor is smaller than the relative distance between the second touch point and the first sensor, the left depth parameter corresponding to the first left position index is greater than the left depth parameter corresponding to the second left position index.

19. The method according to claim 16, wherein when a relative distance between the first touch point and the second sensor is greater than a relative distance between the second touch point and the second sensor, the right depth parameter corresponding to the first right position index is smaller than the right depth parameter corresponding to the second right position index; and, when the relative distance between the first touch point and the second sensor is smaller than the relative distance between the second touch point and the second sensor, the right depth parameter corresponding to the first right position index is greater than the right depth parameter corresponding to the second right position index.

20. The method according to claim 14, wherein the first sensor and the second sensor are depth lenses.

21. The method according to claim 14, wherein a number of the candidate touch points is equal to a square of a number of the at least two objects.

* * * * *